United States Patent
Song et al.

(10) Patent No.: US 11,940,814 B2
(45) Date of Patent: Mar. 26, 2024

(54) COOPERATIVE DRIVING METHOD BASED ON DRIVING NEGOTIATION AND APPARATUS FOR THE SAME

(71) Applicant: ELECTRONICS AND TELECOMMUNICATIONS RESEARCH INSTITUTE, Daejeon (KR)

(72) Inventors: Yoo-Seung Song, Daejeon (KR); Joo-Young Kim, Daejeon (KR); Kyoung-Wook Min, Sejong-si (KR); Yong-Woo Jo, Daejeon (KR); Jeong-Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 97 days.

(21) Appl. No.: 17/532,089

(22) Filed: Nov. 22, 2021

(65) Prior Publication Data
US 2023/0056581 A1 Feb. 23, 2023

(30) Foreign Application Priority Data
Aug. 19, 2021 (KR) .......................... 10-2021-0109621

(51) Int. Cl.
*G05D 1/02* (2020.01)
*B60W 60/00* (2020.01)
(Continued)

(52) U.S. Cl.
CPC ....... *G05D 1/0291* (2013.01); *B60W 60/0015* (2020.02); *G05D 1/0289* (2013.01);
(Continued)

(58) Field of Classification Search
CPC .............. G05D 1/0291; G05D 1/0289; G05D 2201/0213; G05D 1/0287; B60W 60/0015;
(Continued)

(56) References Cited

U.S. PATENT DOCUMENTS

| 9,605,968 B2 | 3/2017 | Song et al. |
| 10,788,843 B2 | 9/2020 | Park |

(Continued)

FOREIGN PATENT DOCUMENTS

| JP | 2008-134841 | 6/2008 |
| KR | 10-2016-0063047 | 6/2016 |

(Continued)

OTHER PUBLICATIONS

Elham Semsar-Kazerooni et al., "Interaction protocols for cooperative merging and lane reduction scenarios", 2015 IEEE 18th International Conference on Intelligent Transportation Systems, 2015, pp. 1964-1970.

*Primary Examiner* — Rodney A Butler
(74) *Attorney, Agent, or Firm* — KILE PARK REED & HOUTTEMAN PLLC (57) ABSTRACT

Disclosed herein are a cooperative driving method based on driving negotiation and an apparatus for the same. The cooperative driving method is performed by a cooperative driving apparatus for cooperative driving based on driving negotiation, and includes determining whether cooperative driving is possible in consideration of a driving mission of a requesting vehicle that requests cooperative driving with neighboring vehicles, when it is determined that cooperative driving is possible, setting a responding vehicle from which cooperative driving is to be requested among the neighboring vehicles, performing driving negotiation between the requesting vehicle and the responding vehicle based on a driving negotiation protocol, and when the driving negotia- (Continued)

tion is completed, performing cooperative driving by providing driving guidance information for vehicle control to at least one of the requesting vehicle and the responding vehicle.

14 Claims, 7 Drawing Sheets

(51) Int. Cl.
    *G05D 1/00*     (2006.01)
    *H04W 4/44*     (2018.01)
    *H04W 4/46*     (2018.01)

(52) U.S. Cl.
    CPC ............... *H04W 4/44* (2018.02); *H04W 4/46* (2018.02); *B60W 2556/50* (2020.02); *B60W 2556/65* (2020.02); *G05D 2201/0213* (2013.01)

(58) Field of Classification Search
    CPC ......... B60W 2556/50; B60W 2556/65; B60W 10/20; B60W 40/105; B60W 50/14; B60W 2050/0005; B60W 2720/10; B60W 2756/10; H04W 4/44; H04W 4/46; H04W 4/12; G08G 1/22
    See application file for complete search history.

(56) References Cited

U.S. PATENT DOCUMENTS

| | | | |
|---|---|---|---|
| 11,377,118 | B2 | 7/2022 | Fuchs et al. |
| 2002/0198660 | A1 | 12/2002 | Lutter et al. |
| 2011/0066312 | A1 | 3/2011 | Sung et al. |
| 2012/0074842 | A1* | 3/2012 | Hattori ................. B60Q 1/1423 315/76 |
| 2015/0336576 | A1 | 11/2015 | Sung et al. |
| 2019/0051159 | A1* | 2/2019 | Wang ................... G05D 1/0088 |
| 2021/0312809 | A1* | 10/2021 | Priev ................... G05D 1/0295 |
| 2021/0350709 | A1* | 11/2021 | Li ......................... H04W 24/04 |
| 2022/0258732 | A1* | 8/2022 | Avedisov ........ B60W 30/18163 |
| 2023/0136285 | A1* | 5/2023 | Chujo .................. H04W 28/12 370/329 |

FOREIGN PATENT DOCUMENTS

| | | |
|---|---|---|
| KR | 10-2017-0089121 | 8/2017 |
| KR | 10-2017-0096075 | 8/2017 |
| KR | 10-2018-0084463 | 7/2018 |
| KR | 10-2021-0003752 | 1/2021 |

\* cited by examiner

COOPERATIVE DRIVING METHOD BASED ON DRIVING NEGOTIATION AND APPARATUS FOR THE SAME

CROSS REFERENCE TO RELATED APPLICATION

This application claims the benefit of Korean Patent Application No. 10-2021-0109621, filed Aug. 19, 2021, which is hereby incorporated by reference in its entirety into this application.

BACKGROUND OF THE INVENTION

1. Technical Field

The present invention relates generally to technology for cooperative driving between vehicles, and more particularly to technology for performing cooperative driving between vehicles by executing communication protocols for cooperative driving through vehicles and infrastructure.

2. Description of the Related Art

With the development of Advanced Driver Assistance Systems (ADAS), the safety and convenience of driving has gradually improved. The level of autonomous driving provided by autonomous driving systems is continually increasing, and commercial vehicles meeting autonomous driving level 2.5 have recently been released. In Korea, related core technology has been developed through various industry-university-institute collaboration projects with the goal of satisfying autonomous driving level 4 or more by 2027.

In order to improve the safety and reliability of autonomous driving, vehicular communication technology is combined with autonomous driving technology and used in that form. Initially, owing to the high latency of communication technology and low communication speed performance, such combination technology is limited only to a warning service for providing notification of danger during driving, but the range of service has gradually expanded along with improvements in communication performance.

Recently, with the development and standardization of fifth-generation (5G) New-Radio (NR) Vehicle-to-Everything (V2X) technology, real-time data transfer and transmission of large amounts of information between two objects have become possible, and thus expansion of a sensing range required for autonomous driving and transmission/reception of Local Dynamic Map (LDM) information have also become possible. In conventional technology, data has been unidirectionally transmitted to a plurality of moving objects, or alternatively, only service limited to broadcasting has been provided. However, with the development of communication technology, related technology has been developed to the level at which one moving object is capable of controlling the other moving object (e.g., vehicle) while exchanging data with the corresponding moving object in real time.

To date, most research has been conducted on a form in which one moving object or a specific vehicle controller receives surrounding communication information, determines priorities for passage, such as at an intersection or a junction, and unilaterally distributes the determined priorities. For example, in the case of remote parking, research into a scheme in which location information of an entering vehicle is recognized and a server generates a route to a destination and issues control information to the corresponding vehicle has been conducted. However, for more efficient and safe driving between vehicles, the need for research into technology for allowing multiple moving vehicles to continually and closely exchange information therebetween remains.

PRIOR ART DOCUMENTS

Patent Documents (Patent Document 1) Korean Patent Application Publication No. 10-2017-0096075, Date of Publication: Aug. 23, 2017 (Title: Apparatus and method for self-driving of vehicle in linking area)

SUMMARY OF THE INVENTION

Accordingly, the present invention has been made keeping in mind the above problems occurring in the prior art, and an object of the present invention is to provide technology for more efficient and safe cooperative driving between vehicles.

Another object of the present invention is to easily carry out the driving mission of a vehicle through cooperation between vehicles or between a vehicle and infrastructure.

A further object of the present invention is to provide a method for carrying out a driving mission through cooperation between vehicles in respective cases in which an arbitrator for cooperative driving between vehicles is present and is not present.

Yet another object of the present invention is to allow a vehicle that carries out a driving mission to efficiently and safely drive.

In accordance with an aspect of the present invention to accomplish the above objects, there is provided a cooperative driving method performed by a cooperative driving apparatus for cooperative driving based on driving negotiation, the cooperative driving method including determining whether cooperative driving is possible in consideration of a driving mission of a requesting vehicle that requests cooperative driving with neighboring vehicles; when it is determined that cooperative driving is possible, setting a responding vehicle from which cooperative driving is to be requested among the neighboring vehicles; performing driving negotiation between the requesting vehicle and the responding vehicle based on a driving negotiation protocol; and when the driving negotiation is completed, performing cooperative driving by providing driving guidance information for vehicle control to at least one of the requesting vehicle and the responding vehicle.

At least one of the requesting vehicle and the responding vehicle may perform cooperative driving for completing the driving mission by controlling vehicle driving in accordance with the driving guidance information.

The driving guidance information may include information required for control of at least one of a speed, a location, and steering of the corresponding vehicle, and may continue to be provided until the driving mission is completed.

The driving negotiation may be performed based on direct communication between the requesting vehicle and the responding vehicle, or may be performed based on communication between the requesting vehicle and the responding vehicle using an arbitrator installed at a roadside.

The driving negotiation protocol may include a procedure for sending/receiving a message for a start of cooperative driving between the requesting vehicle and the responding vehicle, a procedure for notifying the requesting vehicle and the responding vehicle of a start of cooperative driving, a procedure for sending/receiving a message for an end of cooperative driving between the requesting vehicle and the responding vehicle, and a procedure for ending the cooperative driving.

When communication using the arbitrator is performed, the arbitrator may arbitrate message transfer between the requesting vehicle and the responding vehicle.

Setting the responding vehicle may include setting the responding vehicle in consideration of driving information and the driving mission of the requesting vehicle.

Performing the cooperative driving may include receiving vehicle reaction information in which control corresponding to the driving guidance information is reflected from at least one of the requesting vehicle and the responding vehicle, and performing the cooperative driving in consideration of the vehicle reaction information.

In accordance with another aspect of the present invention to accomplish the above objects, there is provided a cooperative driving apparatus, including a processor for determining whether cooperative driving is possible in consideration of a driving mission of a requesting vehicle that requests cooperative driving with neighboring vehicles, when it is determined that cooperative driving is possible, setting a responding vehicle from which cooperative driving is to be requested among the neighboring vehicles, performing driving negotiation between the requesting vehicle and the responding vehicle based on a driving negotiation protocol, and when the driving negotiation is completed, performing cooperative driving by providing driving guidance information for vehicle control to at least one of the requesting vehicle and the responding vehicle; and memory for storing the driving guidance information.

At least one of the requesting vehicle and the responding vehicle may perform cooperative driving for completing the driving mission by controlling vehicle driving in accordance with the driving guidance information.

The driving guidance information may include information required for control of at least one of a speed, a location, and steering of the corresponding vehicle, and may continue to be provided until the driving mission is completed.

The driving negotiation may be performed based on direct communication between the requesting vehicle and the responding vehicle, or may be performed based on communication between the requesting vehicle and the responding vehicle using an arbitrator installed at a roadside.

The driving negotiation protocol may include a procedure for sending/receiving a message for a start of cooperative driving between the requesting vehicle and the responding vehicle, a procedure for notifying the requesting vehicle and the responding vehicle of a start of cooperative driving, a procedure for sending/receiving a message for an end of cooperative driving between the requesting vehicle and the responding vehicle, and a procedure for ending the cooperative driving.

When communication using the arbitrator is performed, the arbitrator may arbitrate message transfer between the requesting vehicle and the responding vehicle.

The processor may set the responding vehicle in consideration of driving information and the driving mission of the requesting vehicle.

The processor may receive vehicle reaction information in which control corresponding to the driving guidance information is reflected from at least one of the requesting vehicle and the responding vehicle, and may perform the cooperative driving in consideration of the vehicle reaction information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
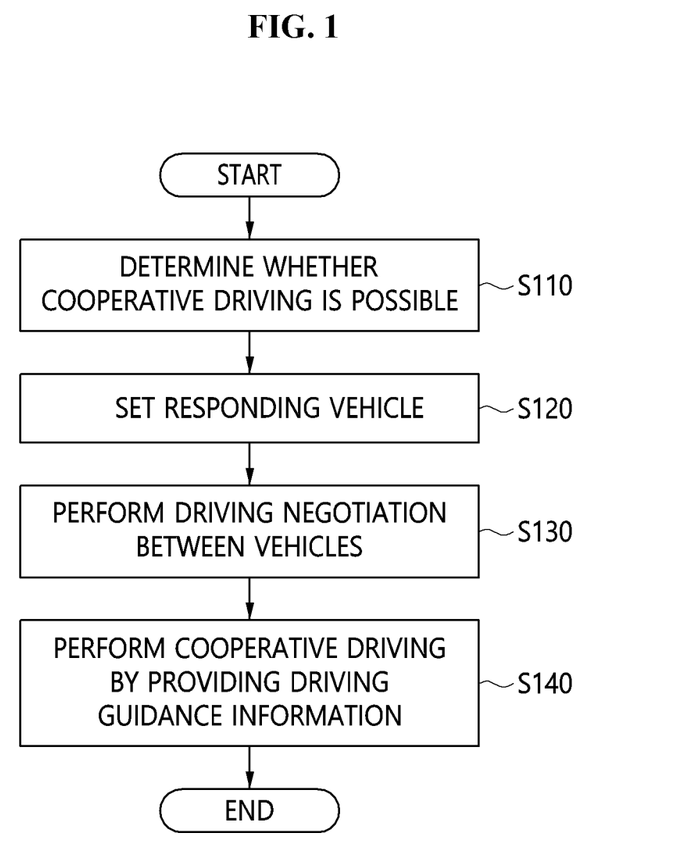
FIG. 1 is an operation flowchart illustrating a cooperative driving method based on driving negotiation according to an embodiment of the present invention.

FIG. 1 is an operation flowchart illustrating a cooperative driving method based on driving negotiation according to an embodiment of the present invention.

Referring to FIG. 1, in the cooperative driving method based on driving negotiation according to the embodiment of the present invention, a cooperative driving apparatus determines whether cooperative driving is possible in consideration of the driving mission of a vehicle that requests cooperative driving with neighboring vehicles at step S110.

Next, in the cooperative driving method based on driving negotiation according to the embodiment of the present invention, the cooperative driving apparatus sets a responding vehicle from which cooperative driving is to be requested among the neighboring vehicles when it is determined that cooperative driving is possible at step S120.

Here, the responding vehicle may be set in consideration of the driving information and the driving mission of the requesting vehicle.

Further, in the cooperative driving method based on driving negotiation according to the embodiment of the present invention, the cooperative driving apparatus performs driving negotiation between the requesting vehicle and the responding vehicle based on a driving negotiation protocol at step S130.

Here, the driving negotiation may be performed either based on direct communication between the requesting vehicle and the responding vehicle or based on communication between the requesting vehicle and the responding vehicle through an arbitrator installed at a roadside.

Here, the driving negotiation protocol may include a procedure for sending/receiving a message for the start of cooperative driving between the requesting vehicle and the responding vehicle, a procedure for notifying the requesting vehicle and the responding vehicle of the start of cooperative driving, a procedure for sending/receiving a message for the end of cooperative driving between the requesting vehicle and the responding vehicle, and a procedure for ending the cooperative driving.

Here, when communication is performed through the arbitrator, the arbitrator may arbitrate message transfer between the requesting vehicle and the responding vehicle.

Furthermore, in the cooperative driving method based on driving negotiation according to the embodiment of the present invention, when driving negotiation is completed, the cooperative driving apparatus provides driving guidance information for vehicle control to at least one of the requesting vehicle and the responding vehicle, thus performing cooperative driving at step S140.

Here, at least one of the requesting vehicle and the responding vehicle may perform cooperative driving for completing the driving mission by controlling the driving of the corresponding vehicle in accordance with the driving guidance information.

The driving guidance information may include information required for control of at least one of the speed, location, and steering of each vehicle, and may continue to be provided until the driving mission is completed.

Here, vehicle reaction information in which control corresponding to the driving guidance information is reflected may be received from at least one of the requesting vehicle and the responding vehicle, and cooperative driving may be performed in consideration of the vehicle reaction information.

That is, as described at steps S110 to S140, examples of usage of a representative service according to the present invention may be separately described for the respective cases of cooperative driving performed through driving negotiation based on direct communication between vehicles and cooperative driving performed through driving negotiation based on communication using an infrastructure arbitrator.

Figure 2:
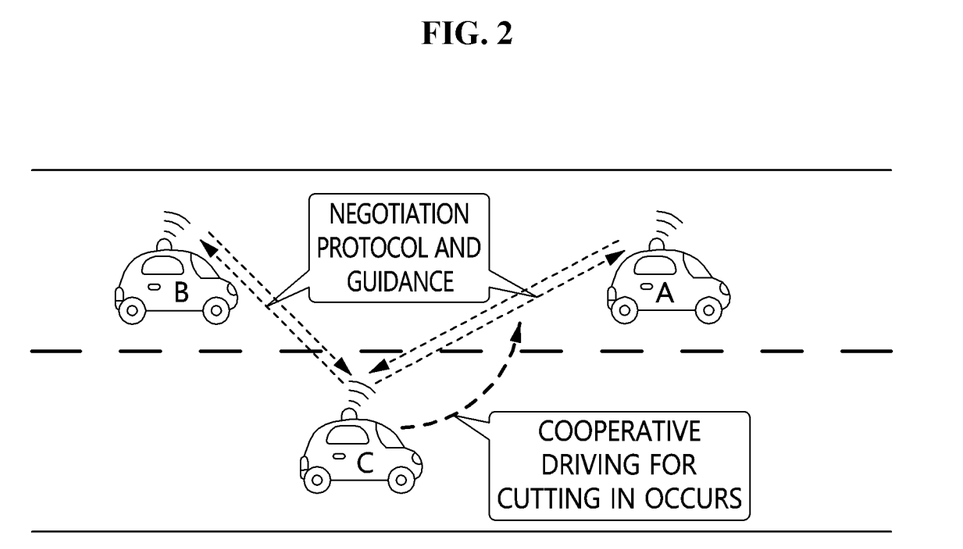
FIGS. 2 and 3 are diagrams illustrating a process for performing cooperative driving based on direct communication between vehicles according to the present invention.

For example, FIG. 2 illustrates an example in which an event for performing cooperative driving occurs in order for vehicle C to carry out a driving mission for 'cutting in when driving' between vehicle A and vehicle B, which are driving.

In this case, 'cutting in when driving' described as an example is one of various types of driving missions, and the method proposed by the present invention may equally apply to all cases where cooperative driving with other vehicles is required.

Referring to FIG. 2, vehicle C may determine whether cooperative driving with an additional vehicle is required in order to carry out the driving mission 'cutting in when driving'. If it is determined that cooperative driving is required, vehicle C undertakes a driving negotiation procedure required for cooperative driving with neighboring vehicles, that is, vehicle A and vehicle B. When driving negotiation is completed, vehicle C may perform cutting in when driving, which is the driving mission, while exchanging driving guidance information, required for cutting in when driving, with vehicle A and vehicle B.

In the embodiment of FIG. 2, the vehicle leading the cooperative driving may be vehicle C, and may also lead a cooperative driving completion procedure after the driving mission 'cutting in when driving' has been performed.

In this case, in the environment of FIG. 2, the flow of communication protocols and messages between objects required for cooperative driving is described below.

Figure 3:
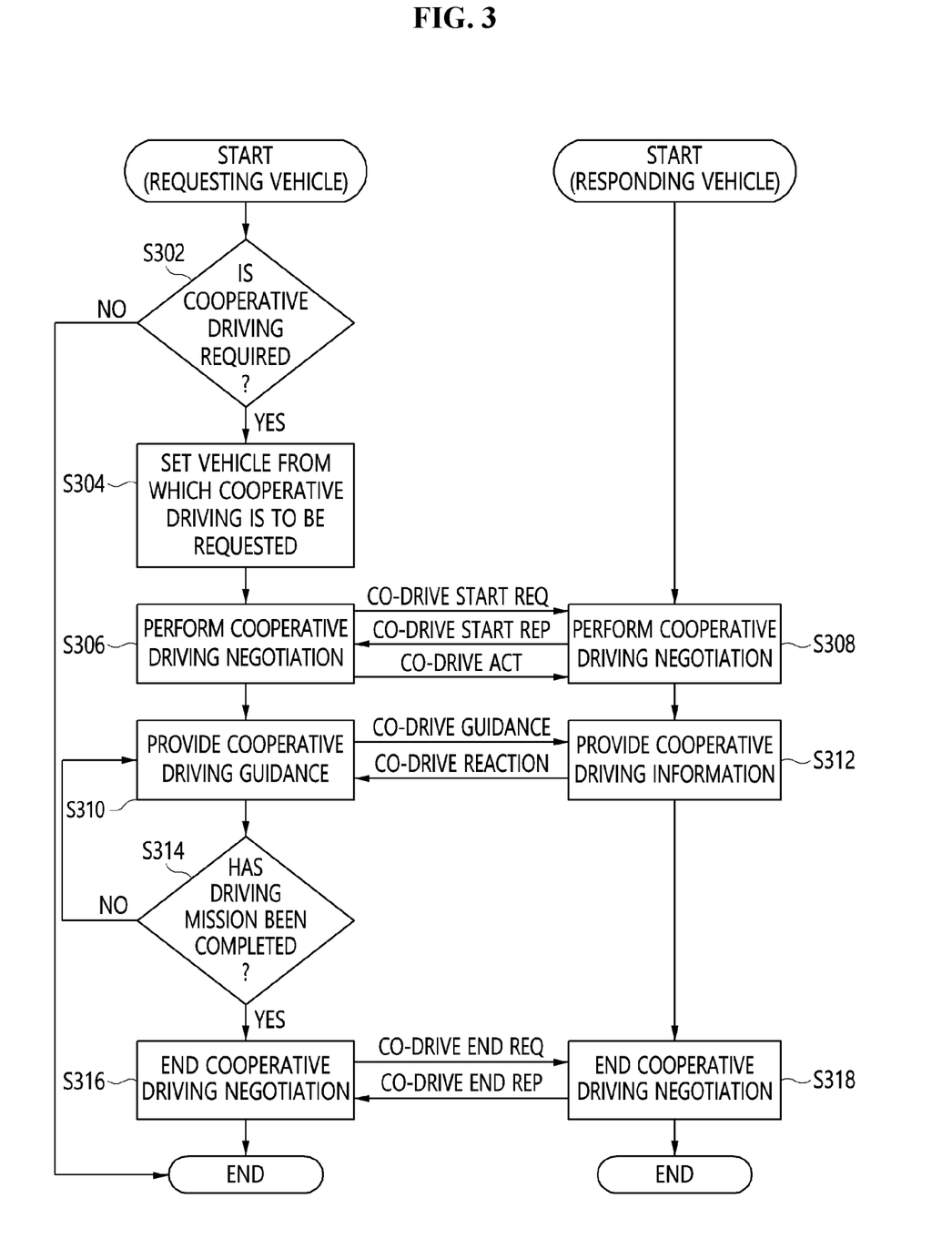

Referring to FIG. 3, a requesting vehicle may first determine whether cooperative driving with neighboring vehicles is required in order to carry out a required driving mission at step S302.

If it is determined at step S302 that cooperative driving is required, the requesting vehicle sets a responding vehicle from which cooperative driving is to be requested among the neighboring vehicles at step S304, and may perform driving negotiation based on a driving negotiation protocol at steps S306 and S308.

If it is determined at step S302 that cooperative driving is not required, the corresponding process may be terminated.

Here, the procedure for driving negotiation at steps S306 and S308 may be performed in such a way that, when the requesting vehicle sends a cooperative driving start request message CO-DRIVE START REQ to the responding vehicle and receives a cooperative driving start accept message CO-DRIVE START REP from the responding vehicle, driving negotiation may progress based on a protocol ultimately indicating a cooperative driving start CO-DRIVE ACT.

When driving negotiation is successfully progressed at steps S306 and S308, the requesting vehicle may provide detailed driving guidance information CO-DRIVE GUIDANCE, required for the driving mission, to the responding vehicle at step S310.

Here, the driving guidance information transmitted from the requesting vehicle to the responding vehicle may include the (decreased/increased) speed, location, steering, or the like of the responding vehicle.

Thereafter, the responding vehicle may control vehicle functions with reference to the driving guidance information, and may respond by providing vehicle reaction information in which control is reflected at step S312.

Here, the requesting vehicle may continue to provide the guidance information until the driving mission is completed.

Thereafter, the requesting vehicle determines whether the driving mission has been completed at step S314. If it is determined that the driving mission has been completed, a negotiation end procedure for ending the cooperative driving may be performed at steps S316 and S318.

Here, the requesting vehicle sends a cooperative driving end request message CO-DRIVE END REQ to the responding vehicle, and the responding vehicle responds by sending a cooperative driving end accept message CO-DRIVE END REP, thus finishing the cooperative driving.

On the other hand, if it is determined at step S314 that the driving mission has not been completed, the driving guidance information may be provided while steps S310 and S312 are repeatedly performed until the driving mission is completed.

Figure 4:
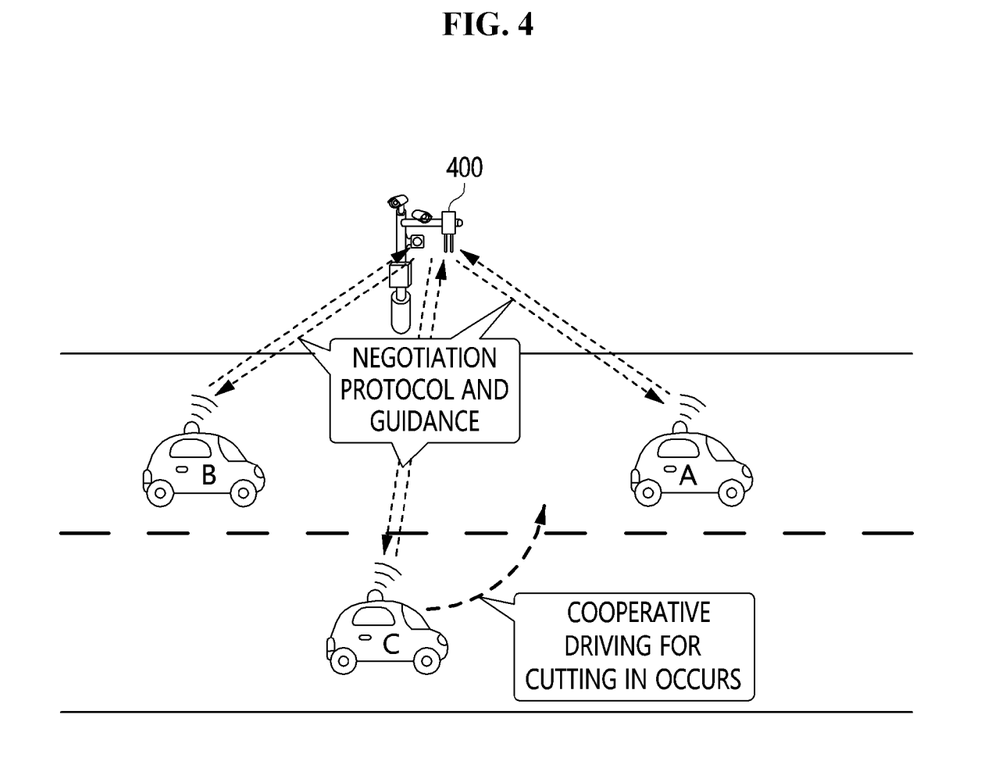
FIGS. 4 and 5 are diagrams illustrating a process for performing cooperative driving based on communication using an arbitrator according to the present invention.

In another example, FIG. 4 illustrates an embodiment in which an event of performing cooperative driving occurs so as to carry out the driving mission 'cutting in when driving' in the same manner as the situation of FIG. 2, through infrastructure or a roadside arbitrator 400 installed at the roadside.

Referring to FIG. 4, vehicle C may send a request indicating that cooperative driving is required to the roadside arbitrator 400 so as to carry out the driving mission 'cutting in when driving'. The roadside arbitrator 400 may progress a procedure for driving negotiation required for cooperative driving together with associated vehicles to carry out the driving mission of vehicle C. When the driving negotiation is completed, the roadside arbitrator 400 may provide driving guidance information required for the driving mission of vehicle C, that is, 'cutting in when driving'.

In the case of FIG. 4 as well, a vehicle leading the cooperative driving is vehicle C, and the roadside arbitrator 400 may function to arbitrate communication of vehicle C with vehicle A and vehicle B in order to perform cooperative driving.

Here, in the environment of FIG. 4, the flow of communication protocols and messages between objects, required for cooperative driving, is described below.

Figure 5:
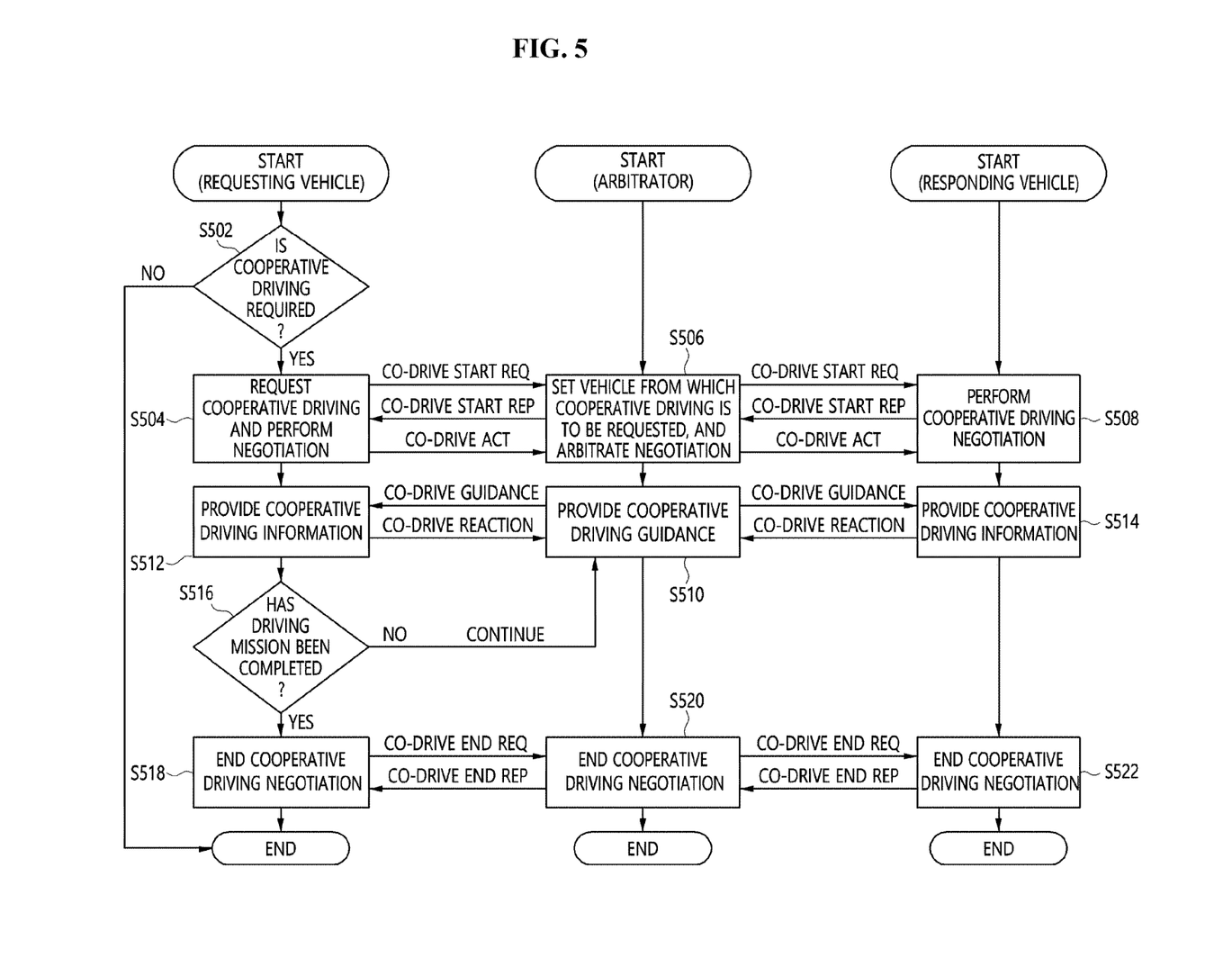

Referring to FIG. 5, a requesting vehicle may determine whether cooperative driving with neighboring vehicles is required in order to carry out a required driving mission at step S502.

If it is determined at step S502 that cooperative driving is required, the requesting vehicle may request cooperative driving from a roadside arbitrator, and the roadside arbitrator may set a responding vehicle from which cooperative driving is to be requested among the neighboring vehicles, and then perform driving negotiation at steps S504, S506, and S508.

Further, if it is determined at step S502 that cooperative driving is not required, the corresponding process may be terminated.

Here, the driving negotiation procedure at steps S504, S506, and S508 is performed in such a way that, when the requesting vehicle sends a cooperative driving start request message CO-DRIVE START REQ to the roadside arbitrator, the roadside arbitrator may perform arbitration by ascertaining and setting vehicles required for cooperative driving so as to carry out the driving mission of the requesting vehicle and by sending a cooperative driving start request message CO-DRIVE START REQ to the set responding vehicle. Thereafter, when a cooperative driving start accept message CO-DRIVE START REP is received from the responding vehicle in response to the request message, the roadside arbitrator may respond by sending a cooperative driving start accept message CO-DRIVE START REP to the requesting vehicle. Thereafter, when the requesting vehicle sends a cooperative driving start message CO-DRIVE ACT to the roadside arbitrator in response to the cooperative driving start accept message, the roadside arbitrator may also respond by sending a cooperative driving start message CO-DRIVE ACT to the responding vehicle.

Thereafter, the roadside arbitrator may transmit driving guidance information CO-DRIVE GUIDANCE required in order to carry out the driving mission of the requesting vehicle both to the requesting vehicle and to the responding vehicle, and may receive changed vehicle driving status information CO-DRIVE REACTION, in which vehicle control performed with reference to the driving guidance information is reflected, from the requesting vehicle and the responding vehicle at steps S510, S512, and S514.

Here, the requesting vehicle may continue to send a message to the roadside arbitrator until the driving mission is completed, and the roadside arbitrator and the vehicles may repeatedly exchange the driving guidance information and the status information in which control is reflected, with each other.

Thereafter, the requesting vehicle determines whether the driving mission has been completed at step S516, and may perform a negotiation end procedure for ending the cooperative driving if it is determined that the driving mission has been completed at steps S518, S520, and S522.

Here, the requesting vehicle may transfer a cooperative driving end request message CO-DRIVE END REQ to the roadside arbitrator. The roadside arbitrator may send a cooperative driving end request message CO-DRIVE END REQ to the responding vehicle, and may receive a cooperative driving end accept message CO-DRIVE END REP from the responding vehicle. Thereafter, when the roadside arbitrator sends a cooperative driving end accept message CO-DRIVE END REP to the requesting vehicle, all cooperative driving communication protocols may be terminated.

Further, if it is determined at step S516 that the driving mission has not yet been completed, the driving guidance information may be provided while steps S510 to S514 are repeatedly performed until the driving mission is completed.

By means of this cooperative driving method, more efficient and safe cooperative driving between vehicles may be performed.

Further, the driving mission of a vehicle may be easily carried out through cooperation between vehicles or between a vehicle and infrastructure.

Furthermore, a driving mission may be carried out through cooperation between vehicles in respective cases in which an arbitrator for cooperative driving between vehicles is present and is not present.

Furthermore, a vehicle that carries out a driving mission may more efficiently and safely drive.

Figure 6:
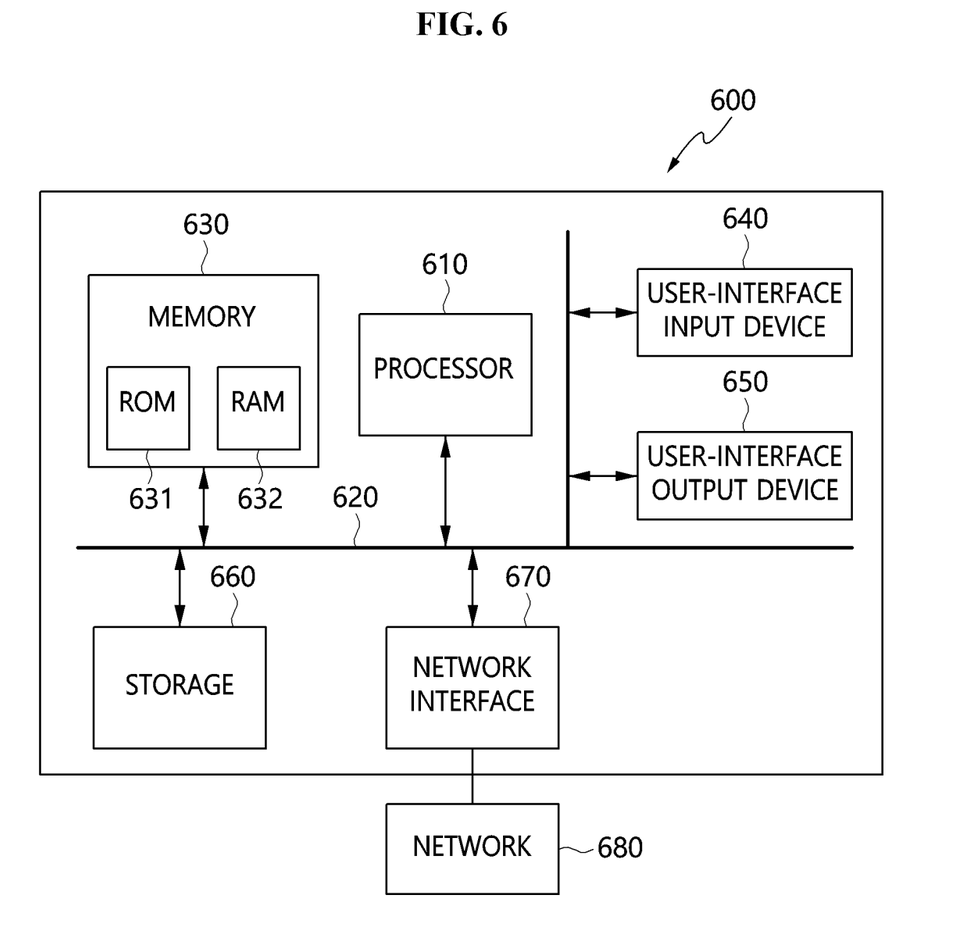
FIG. 6 is a block diagram illustrating a cooperative driving apparatus based on driving negotiation according to an embodiment of the present invention.

FIG. 6 is a block diagram illustrating a cooperative driving apparatus based on driving negotiation according to an embodiment of the present invention.

Referring to FIG. 6, the cooperative driving apparatus according to the embodiment of the present invention may be implemented in the form of a computer system, such as a computer-readable storage medium. As illustrated in FIG. 6, a computer system 600 may include one or more processors 610, memory 630, a user interface input device 640, a user interface output device 650, and storage 660, which communicate with each other through a bus 620. The computer system 600 may further include a network interface 670 connected to a network 680. Each processor 610 may be a Central Processing Unit (CPU) or a semiconductor device for executing processing instructions stored in the memory 630 or the storage 660. Each of the memory 630 and the storage 660 may be any of various types of volatile or nonvolatile storage media. For example, the memory 630 may include Read-Only Memory (ROM) 631 or Random Access Memory (RAM) 632.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

The processor 610 determines whether cooperative driving is possible in consideration of the driving mission of a vehicle that requests cooperative driving with neighboring vehicles.

Further, the processor 610 sets the responding vehicle from which cooperative driving is to be requested among the neighboring vehicles if it is determined that cooperative driving is possible.

Here, the responding vehicle may be set in consideration of the driving information and the driving mission of the requesting vehicle.

Further, the processor 610 performs driving negotiation between the requesting vehicle and the responding vehicle based on a driving negotiation protocol.

Here, the driving negotiation may be performed either based on direct communication between the requesting vehicle and the responding vehicle or based on communication between the requesting vehicle and the responding vehicle through an arbitrator installed at a roadside.

Here, the driving negotiation protocol may include a procedure for sending/receiving a message for the start of cooperative driving between the requesting vehicle and the responding vehicle, a procedure for notifying the requesting vehicle and the responding vehicle of the start of cooperative driving, a procedure for sending/receiving a message for the end of cooperative driving between the requesting vehicle and the responding vehicle, and a procedure for ending the cooperative driving.

Here, when communication is performed through the arbitrator, the arbitrator may arbitrate message transfer between the requesting vehicle and the responding vehicle.

Further, when driving negotiation is completed, the processor 610 provides driving guidance information for vehicle control to at least one of the requesting vehicle and the responding vehicle, thus performing cooperative driving.

Here, at least one of the requesting vehicle and the responding vehicle may perform cooperative driving for completing the driving mission by controlling the driving of the corresponding vehicle in accordance with the driving guidance information.

The driving guidance information may include information required for control of at least one of the speed, location, and steering of each vehicle, and may continue to be provided until the driving mission is completed.

Here, the processor 610 may receive vehicle reaction information in which control corresponding to the driving guidance information is reflected from at least one of the requesting vehicle and the responding vehicle, and may perform cooperative driving in consideration of the vehicle reaction information.

By utilizing the cooperative driving apparatus, more efficient and safe cooperative driving between vehicles may be performed.

Further, the driving mission of a vehicle may be easily carried out through cooperation between vehicles or between a vehicle and infrastructure.

Furthermore, a driving mission may be carried out through cooperation between vehicles in respective cases in which an arbitrator for cooperative driving between vehicles is present and is not present.

Furthermore, a vehicle that carries out a driving mission may more efficiently and safely drive.

Figure 7:
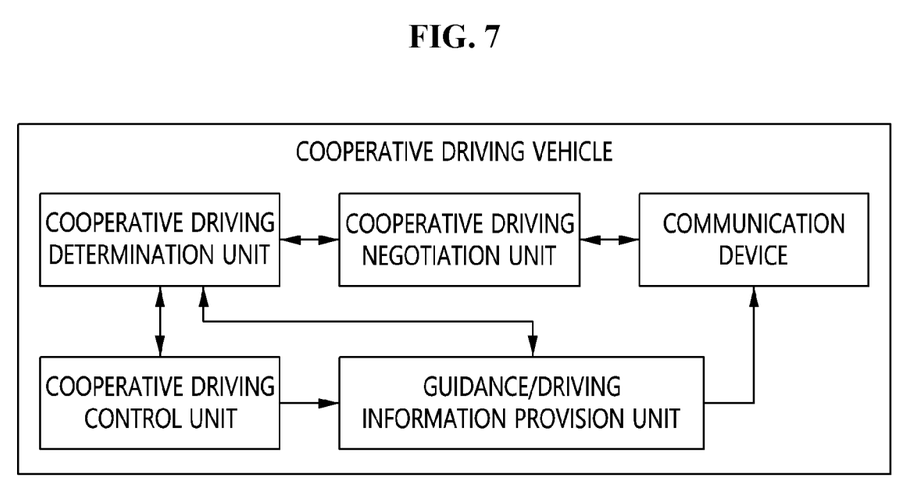
FIG. 7 is a block diagram illustrating an example of a cooperative driving vehicle according to the present invention.

FIG. 7 is a block diagram illustrating an example of a cooperative driving vehicle according to an embodiment of the present invention.

Referring to FIG. 7, the cooperative driving vehicle according to the present invention may include a cooperative driving determination unit, a cooperative driving negotiation unit, a cooperative driving control unit, a guidance/driving information provision unit, and a communication device.

The cooperative driving determination unit may determine whether cooperation with an additional vehicle is required for the driving mission of a cooperative driving vehicle, that is, a requesting vehicle, and whether the driving mission has been completed while performing cooperative driving.

The cooperative driving negotiation unit may generate and process communication protocols, that is, driving negotiation protocols, which are required in order to perform negotiations, such as agreement and termination (end) for cooperative driving.

The cooperative driving control unit may control the vehicle with reference to driving guidance information, and may function to provide status information required in order to transfer a portion in which control is reflected in vehicle driving depending on the driving guidance information to the additional vehicle with which cooperative driving is performed.

The functions of the guidance/driving information provision unit may be distinguished from each other depending on whether the corresponding vehicle is a requesting vehicle that requests cooperative driving or a responding vehicle that supports cooperative driving. First, when the corresponding vehicle is a requesting vehicle that request cooperative driving, the guidance/driving information provision unit may generate and transfer request information required for control of the speed, steering, location, or the like of the additional vehicle in order to carry out the driving mission. On the other hand, when the corresponding vehicle is a responding vehicle that supports cooperative driving, the guidance/driving information provision unit may control the vehicle with reference to the driving guidance information received for cooperative driving, may receive values changed by control from the cooperative driving control unit, and may then generate current driving information and transfer the current driving information to the requesting vehicle.

The communication device may function to send the messages generated in the above-described procedures in a wireless manner. For example, the communication device may function to transmit or receive the driving negotiation protocols according to the embodiment of the present invention.

Figure 8:
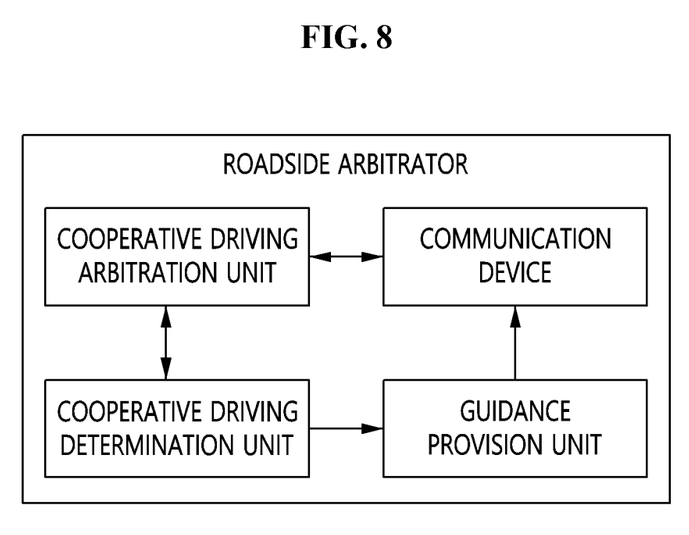
FIG. 8 is a block diagram illustrating an example of a roadside arbitrator according to the present invention.

FIG. 8 is a block diagram illustrating an example of a roadside arbitrator according to an embodiment of the present invention.

Referring to FIG. 8, the roadside arbitrator according to the present invention may include a cooperative driving arbitration unit, a cooperative driving determination unit, a guidance provision unit, and a communication device.

The cooperative driving arbitration unit may perform negotiation by arbitrating procedures, such as agreement and termination (end) for cooperative driving between a requesting vehicle that requests cooperative driving so as to carry out the driving mission of the requesting vehicle and a responding vehicle that supports cooperative driving.

The cooperative driving determination unit may execute strategies required for the driving mission of the requesting vehicle by utilizing an internal sensor of the roadside arbitrator and shared vehicle information received from the requesting vehicle and the responding vehicle.

The guidance provision unit may receive information about the speed, steering, location, etc. of each vehicle, output from the cooperative driving determination unit, and may then generate a guidance protocol required in order to provide driving guidance information.

The communication device may send messages, such as for agreement, termination, and guidance for cooperative driving, to the requesting vehicle and the responding vehicle in a wireless manner.

According to the present invention, there can be provided technology for more efficient and safe cooperative driving between vehicles.

Further, the present invention may easily carry out the driving mission of a vehicle through cooperation between vehicles or between a vehicle and infrastructure.

Furthermore, the present invention may provide a method for carrying out a driving mission through cooperation between vehicles in respective cases in which an arbitrator for cooperative driving between vehicles is present and is not present.

Furthermore, the present invention may allow a vehicle that carries out a driving mission to efficiently and safely drive.

As described above, in the cooperative driving method based on driving negotiation and an apparatus for the cooperative driving method according to the present invention, the configurations and schemes in the above-described embodiments are not limitedly applied, and some or all of the above embodiments can be selectively combined and configured so that various modifications are possible.

What is claimed is:

1. A cooperative driving method performed by a cooperative driving apparatus for cooperative driving based on driving negotiation, the cooperative driving method comprising:
   determining whether cooperative driving is possible in consideration of a driving mission of a requesting vehicle that requests cooperative driving with neighboring vehicles;
   when it is determined that cooperative driving is possible, setting a responding vehicle from which cooperative driving is to be requested among the neighboring vehicles;
   performing driving negotiation between the requesting vehicle and the responding vehicle based on a driving negotiation protocol; and
   when the driving negotiation is completed, performing cooperative driving by providing driving guidance information for vehicle control to at least one of the requesting vehicle and the responding vehicle,
   wherein performing the cooperative driving comprises:
   receiving vehicle information in which control corresponding to the driving guidance information is reflected from at least one of the requesting vehicle and the responding vehicles, and continuously providing the driving guidance information considering the vehicle reaction information until the driving mission is completed.

2. The cooperative driving method of claim 1, wherein at least one of the requesting vehicle and the responding vehicle performs cooperative driving for completing the driving mission by controlling vehicle driving in accordance with the driving guidance information.

3. The cooperative driving method of claim 1, wherein the driving guidance information includes information required for control of at least one of a speed, a location, and steering of the corresponding vehicle.

4. The cooperative driving method of claim 1, wherein the driving negotiation is performed based on direct communication between the requesting vehicle and the responding vehicle, or is performed based on communication between the requesting vehicle and the responding vehicle using an arbitrator installed at a roadside.

5. The cooperative driving method of claim 4, wherein the driving negotiation protocol comprises a procedure for sending/receiving a message for a start of cooperative driving between the requesting vehicle and the responding vehicle, a procedure for notifying the requesting vehicle and the responding vehicle of a start of cooperative driving, a procedure for sending/receiving a message for an end of cooperative driving between the requesting vehicle and the responding vehicle, and a procedure for ending the cooperative driving.

6. The cooperative driving method of claim 5, wherein when communication using the arbitrator is performed, the arbitrator arbitrates message transfer between the requesting vehicle and the responding vehicle.

7. The cooperative driving method of claim 1, wherein setting the responding vehicle comprises:
   setting the responding vehicle in consideration of driving information and the driving mission of the requesting vehicle.

8. A cooperative driving apparatus, comprising:
   a processor for determining whether cooperative driving is possible in consideration of a driving mission of a requesting vehicle that requests cooperative driving with neighboring vehicles, when it is determined that cooperative driving is possible, setting a responding vehicle from which cooperative driving is to be requested among the neighboring vehicles, performing driving negotiation between the requesting vehicle and the responding vehicle based on a driving negotiation protocol, and when the driving negotiation is completed, performing cooperative driving by providing driving guidance information for vehicle control to at least one of the requesting vehicle and the responding vehicle; and
   a memory for storing the driving guidance information
   wherein the processor receives vehicle reaction information in which control corresponding to the driving guidance information is reflected from at least one of the requesting vehicle and the responding vehicle, and continuously provides the driving guidance information considering the vehicle reaction information until the driving mission is completed.

9. The cooperative driving apparatus of claim 8, wherein at least one of the requesting vehicle and the responding vehicle performs cooperative driving for completing the driving mission by controlling vehicle driving in accordance with the driving guidance information.

10. The cooperative driving apparatus of claim 8, wherein the driving guidance information includes information required for control of at least one of a speed, a location, and steering of the corresponding vehicle.

11. The cooperative driving apparatus of claim 8, wherein the driving negotiation is performed based on direct communication between the requesting vehicle and the responding vehicle, or is performed based on communication between the requesting vehicle and the responding vehicle using an arbitrator installed at a roadside.

12. The cooperative driving apparatus of claim 11, wherein the driving negotiation protocol comprises a procedure for sending/receiving a message for a start of cooperative driving between the requesting vehicle and the responding vehicle, a procedure for notifying the requesting vehicle and the responding vehicle of a start of cooperative driving, a procedure for sending/receiving a message for an end of cooperative driving between the requesting vehicle and the responding vehicle, and a procedure for ending the cooperative driving.

13. The cooperative driving apparatus of claim 12, wherein when communication using the arbitrator is performed, the arbitrator arbitrates message transfer between the requesting vehicle and the responding vehicle.

14. The cooperative driving apparatus of claim 8, wherein the processor sets the responding vehicle in consideration of driving information and the driving mission of the requesting vehicle.

* * * * *